(12) United States Patent
Hablutzel

(10) Patent No.: US 8,373,794 B2
(45) Date of Patent: Feb. 12, 2013

(54) PHOTO SENSOR ARRAY USING CONTROLLED MOTION

(75) Inventor: Robert P Hablutzel, West Hartford, CT (US)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 13/192,810

(22) Filed: Jul. 28, 2011

(65) Prior Publication Data

US 2011/0279713 A1 Nov. 17, 2011

Related U.S. Application Data

(62) Division of application No. 12/251,016, filed on Oct. 14, 2008, now Pat. No. 8,125,545.

(51) Int. Cl.
*H04N 5/235* (2006.01)
*H04N 3/14* (2006.01)
*H04N 5/335* (2011.01)
*H04N 9/04* (2006.01)
*H04N 9/083* (2006.01)

(52) U.S. Cl. ........ 348/362; 348/270; 348/272; 348/273; 348/239

(58) Field of Classification Search .............. 348/221.1, 348/224.1, 239, 266–283, 360–369; 396/63–64, 396/213, 241, 209, 449, 460–461
See application file for complete search history.

(56) References Cited

U.S. PATENT DOCUMENTS

| | | | |
|---|---|---|---|
| 5,664,243 A | 9/1997 | Okada et al. | |
| 6,137,100 A | 10/2000 | Fossum et al. | |
| 6,346,999 B1 | 2/2002 | Udagawa et al. | |
| 6,566,723 B1 | 5/2003 | Vook et al. | |
| 6,720,995 B1 * | 4/2004 | Kaneda et al. | 348/208.8 |
| 6,771,315 B1 * | 8/2004 | Nanjo et al. | 348/362 |
| 6,903,770 B1 | 6/2005 | Kobayashi et al. | |
| 6,930,723 B1 * | 8/2005 | Tsuda et al. | 348/363 |
| 7,057,659 B1 | 6/2006 | Mihara et al. | |
| 7,365,791 B2 * | 4/2008 | Ikeda | 348/363 |
| 7,450,170 B2 * | 11/2008 | Terai et al. | 348/342 |
| 7,590,285 B2 | 9/2009 | Tsuchiya | |
| 7,656,455 B2 | 2/2010 | Hatano | |
| 7,675,568 B2 * | 3/2010 | Uchiyama | 348/362 |
| 7,800,686 B2 * | 9/2010 | Meguro et al. | 348/361 |
| 8,120,865 B2 * | 2/2012 | Umezu et al. | 359/889 |

(Continued)

FOREIGN PATENT DOCUMENTS

| | | |
|---|---|---|
| KR | 2006-59797 | 6/2006 |
| KR | 2008-48549 | 6/2008 |

OTHER PUBLICATIONS

FujiFilm 4th Generation Super CCD; 2003.

(Continued)

*Primary Examiner* — Nhan T Tran
*Assistant Examiner* — Tuan Le
(74) *Attorney, Agent, or Firm* — Brown & Michaels, PC

(57) ABSTRACT

A movable sensor including a plurality of photo pixel sites arranged in an array comprising a photo sensor and a neutral density filter filtering the photo sensor. Each of the neutral density filters have a density value that are graduated over a range of densities. The sensor is linearly movable across an image. Each point in the image is exposed to at least one pixel site with the graduated density values and each of the photo pixel sites of the array is exposed to a same light input during a time span of exposure, such that the image is captured at a defined range of exposure values and can be combined into a single high dynamic range image.

5 Claims, 3 Drawing Sheets

U.S. PATENT DOCUMENTS

| | | |
|---|---|---|
| 2004/0100570 A1 | 5/2004 | Shizukuishi |
| 2004/0135921 A1* | 7/2004 | Murata et al. ............... 348/342 |
| 2007/0065135 A1* | 3/2007 | Takei et al. ............... 396/241 |
| 2007/0120998 A1* | 5/2007 | Ikeda ............... 348/362 |
| 2007/0127040 A1 | 6/2007 | Davidovici |
| 2008/0024654 A1* | 1/2008 | Shinohara ............... 348/362 |
| 2008/0170228 A1 | 7/2008 | Jiang |
| 2009/0097136 A1* | 4/2009 | Otsu ............... 359/739 |
| 2009/0102953 A1 | 4/2009 | Bornstein et al. |

OTHER PUBLICATIONS

Debevec et al. "Recovering High Dynamic Range Radiance Maps From Photographs", Computer Science Division, University of California at Berkeley, 1977.

Haneishi, H., Image Acquisition Technique for High Dynamic Range Scene Using MultiBand Camera:, AIC Colour 05-10th, Congress of the International Colour Association, 2005.

* cited by examiner

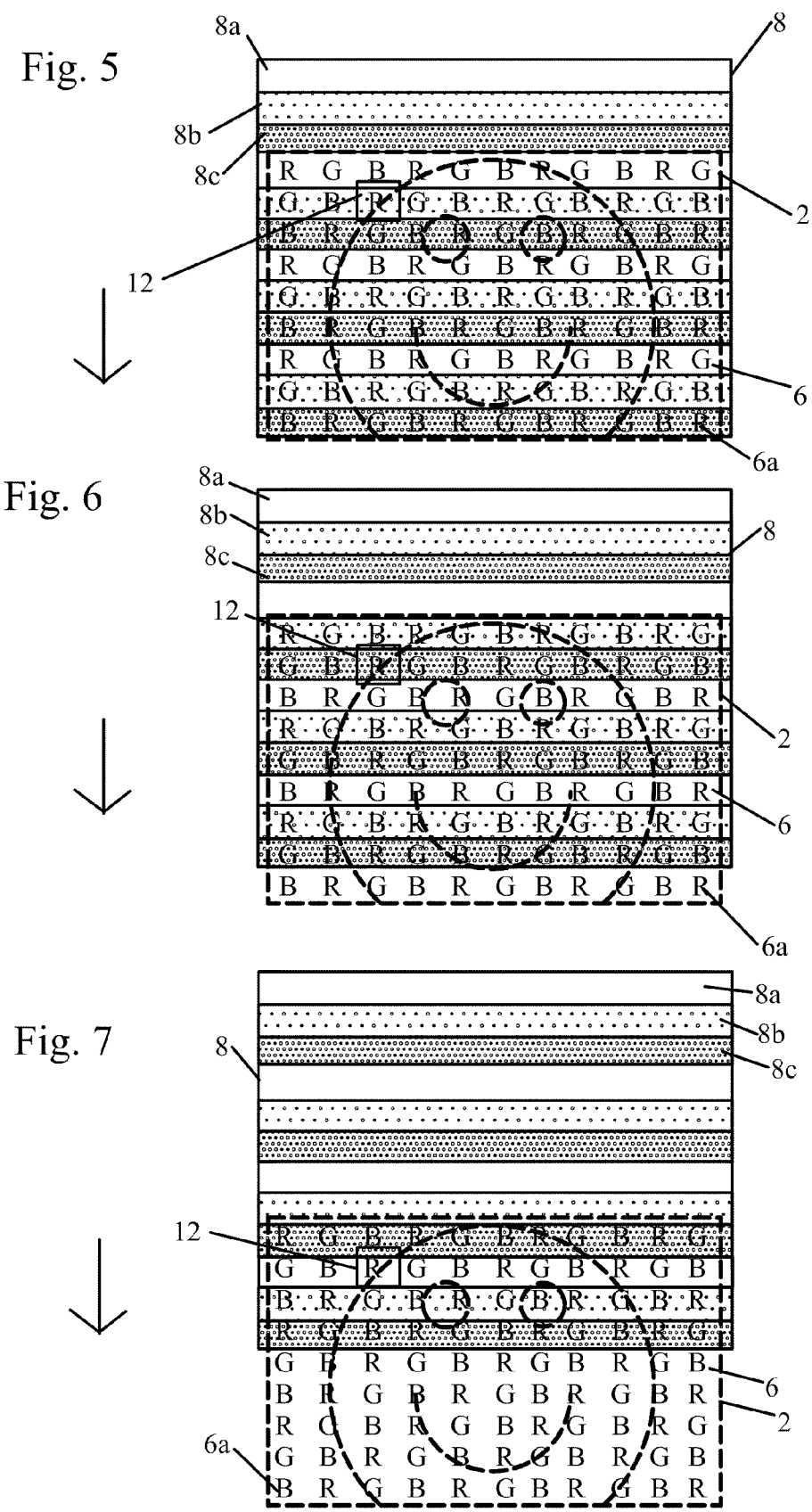

PHOTO SENSOR ARRAY USING CONTROLLED MOTION

REFERENCE TO RELATED APPLICATIONS

This is a divisional patent application of co-pending application Ser. No. 12/251,016, filed Oct. 14, 2008, entitled "PHOTO SENSOR ARRAY USING CONTROLLED MOTION". The aforementioned application is hereby incorporated herein by reference.

BACKGROUND OF THE INVENTION

The present invention relates to photo sensor arrays, and more specifically to photo sensor arrays using controlled motion and graduated filters to capture high dynamic range images.

Current image capture devices used in consumer and professional digital photography rely on sensors that have a relatively low dynamic range, currently ranging up to about 11 EV. While this matches or exceeds the dynamic range of film based technologies, it still falls far short of the dynamic range of the human eye. High dynamic range images allow for the capture of images that more closely match the human perception of a scene, as well as allowing for non-destructing photo image manipulation.

Two existing techniques exist for capturing high dynamic images. First, a dedicated high dynamic range photo sensor can be used. These sensors generally trade resolution for dynamic range. Software exists for merging multiple low resolution images into a high dynamic range image, for example Photoshop® CS3 software, Photomatix™ software, Picturenaut™ software, and HDR Shop™ software. Second, is to completely generate the image digitally.

SUMMARY OF THE INVENTION

A movable sensor including a plurality of photo pixel sites arranged in an array comprising a photo sensor and a neutral density filter filtering the photo sensor. Each of the neutral density filters have a density value that are graduated over a range of densities. The sensor is linearly movable across an image. Each point in the image is exposed to at least one pixel site with the graduated density values and each of the photo pixel sites of the array is exposed to a same light input during a time span of exposure, such that the image is captured at a defined range of exposure values and can be combined into a single high dynamic range image.

A high dynamic range image can be captured using the present invention by aligning an imaging photo sensor comprising a plurality of photo pixel sites arranged in an array comprising a photo sensor and a neutral density filter filtering the photo sensor. Each neutral density filters having a density value, the density values being graduated over a range of densities. The photo sensor is then moved linearly across the image, such that each point in the image is exposed to at least one pixel site having each of the graduated density values and each of the photo pixel sites of the array is exposed to the same light input during a time span of exposure. Then the image is captured and the captured multiple exposure pixel data taken at multiple exposures is combined into a single high dynamic range image using hardware or software.

In an alternate embodiment of the present invention, the photo sensor is stationary and the neutral density filter is linearly movable adjacent to and relative to the photo sensor.

A high dynamic range image can be captured using the present invention of the alternate embodiment by aligning an imaging photo sensor comprising a plurality of photo pixel sites arranged in an array comprising a photo sensor and a neutral density filter filtering the photo sensor. Each neutral density filter having a density value the density values being graduated over a range of densities. The neutral density filter is then moved adjacent to the photo sensor and linearly relative thereto across the image, such that each point in the image is exposed to at least one pixel site having each of the graduated density values and each of the photo pixel sites of the array is exposed to the same light input during a time span of exposure. Then the image is captured and the captured multiple exposure pixel data taken at multiple exposures is combined into a single high dynamic range image using hardware or software.

BRIEF DESCRIPTION OF THE SEVERAL VIEWS OF THE DRAWINGS

FIGS. 5-7 show moving the filter of an alternate embodiment of the present invention with an image projected on a photo sensor in three different positions of the filter versus the image.

DETAILED DESCRIPTION OF THE INVENTION

FIGS. 1-4 show an embodiment of the present invention using a moving photo sensor 4. A photo sensor 4 has an array in which each of the columns 4a linearly records red R, green G, and blue B information. Neutral density filters are added to each of the columns 4a across a range of neutral density values to change the exposure values for individual pixel sites without changing the color values. In other words, the neutral density filters make each site less sensitivity to light without adding any color casts. For example, each column 4a of the photo sensor has a pixel site for red R, green G, and blue B, with dark filters denoted as dark red DR, dark green DG, and dark blue DB, and with very dark filters denoted as very dark red VR, very dark green VG, and very dark blue VB.

A single column 4a of pixel sites of all three color values with filters on the photo sensor array are recorded across a range of exposure values. The pixel sites with the lowest neutral density filter values will record the darkest color values or the shadows, for example red R, green G, and blue B, while the pixel sites with the highest neutral density values will record the brightest color values or the highlights, (i.e. very dark red VR, very dark green VG, very dark blue VB). A wide range of dynamic values can be obtained with additional neutral density arrays and other color patterns could be selected. The number of rows or columns on the photo sensor could also vary based on the application. It is understood that the photo sensor array or arrangement of pixel sites shown in the figures is an unrealistically simple array and is used for explanation purposes only. It is understood that a Bayer filter map arrangement may be used as well as other current photo sensor arrangements.

The photo sensor 4 is movable linearly across an image, for example by being mounted on a linear track, allowing movement in the direction of the neutral density striping, as shown by the arrows in FIGS. 1-4. The photo pixel sites have neutral density filters or graduated filters over them in a range of neutral density values, so that each pixel is exposed a range of exposures. This linear movement allows the photo sensor 4 to be moved such that each column 4a of the photo sensor array is exposed to the same light input during the time span of the exposure. By varying the photo sensor 4 position relative to the image 2 of a smiley face rapidly during exposure, a set of images across a defined range of exposure values can be captured and stored.

Figure 1:
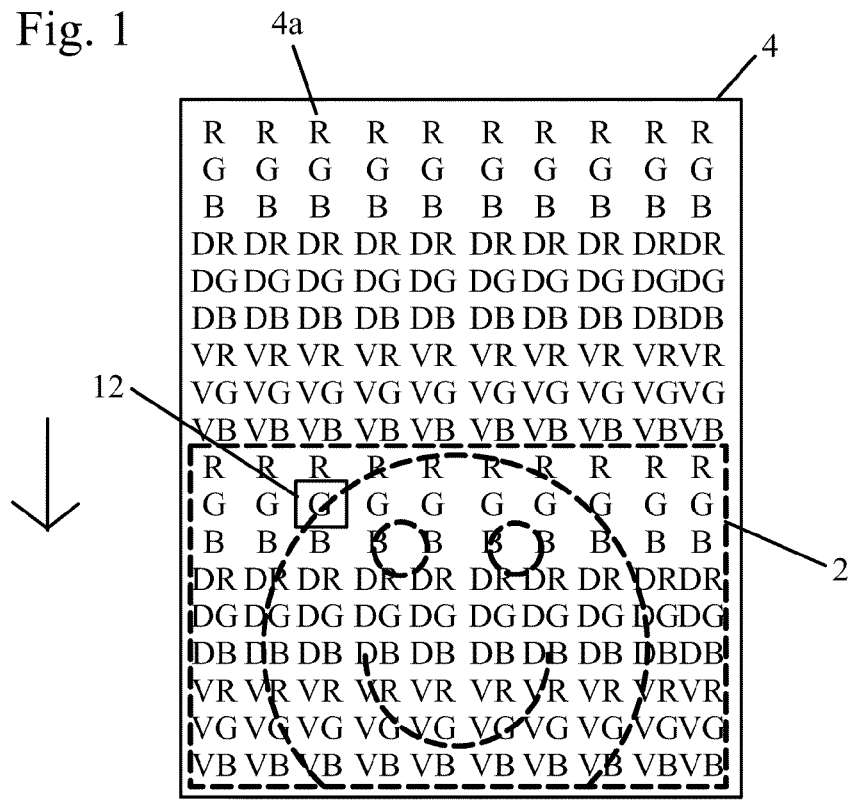
FIGS. 1-4 show moving the photo sensor of an embodiment of the present invention with an image projected on the sensor in four different positions of the sensor versus the image.
Figure 2:
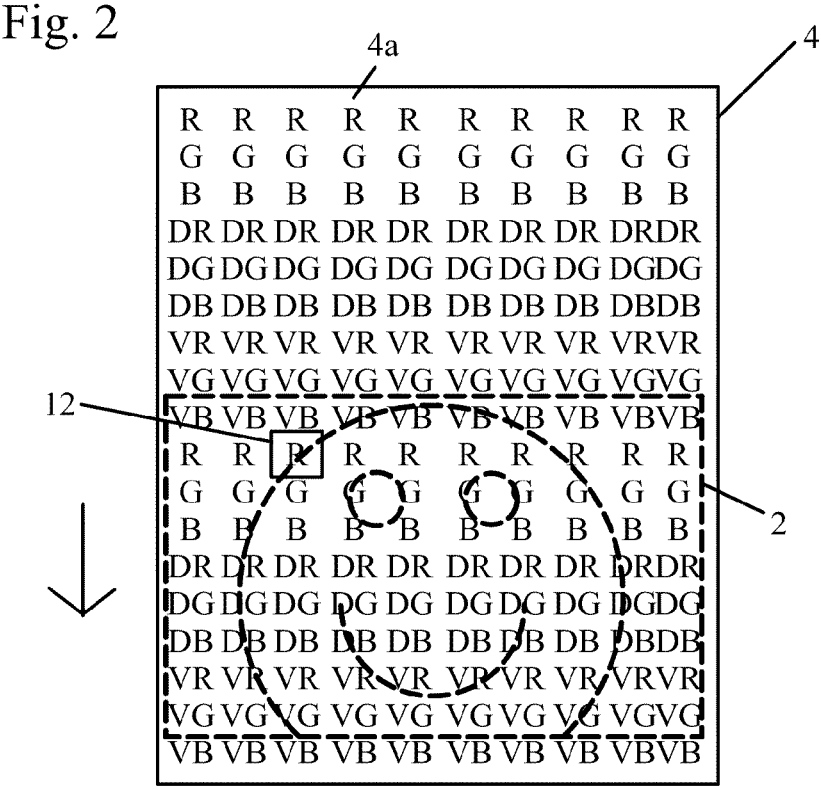
Figure 3:
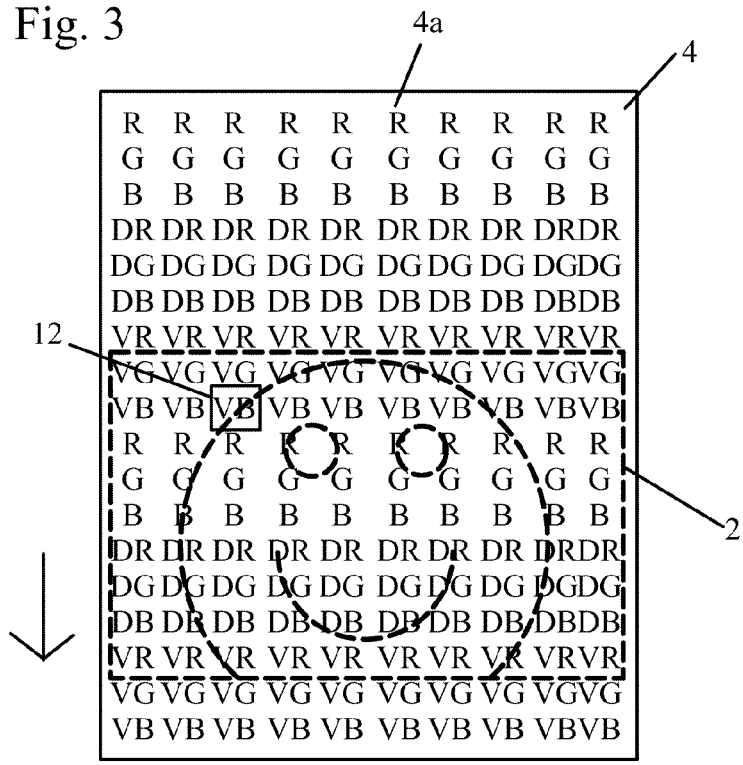
Figure 4:
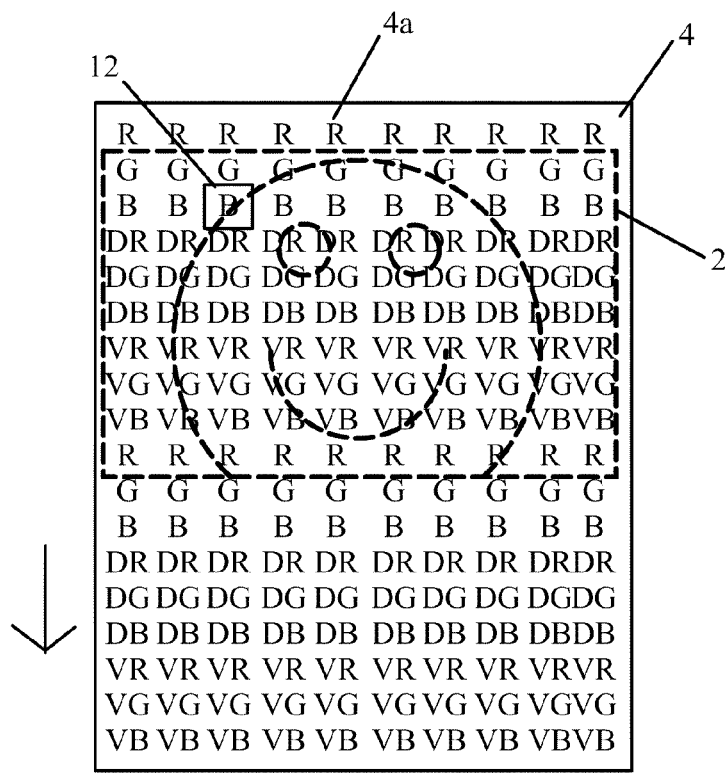

For example, in the photo sensor 4 array shown in FIGS. 1-4, the photo sensor 4 would be moved across the image 2. The image 2 is captured when the sensor 4 is in nine distinct positions, in which the point 12 in the image 2 would be read by photo sensor 4 as green G as shown in FIG. 1, as red R as shown in FIG. 2, as very dark blue DB as shown in FIG. 3, as very dark green VG, as very dark red VR, as dark blue DB, as dark green DG, as dark red DR, and as blue B as shown in FIG. 4 in turn, by linearly moving the photo sensor 4. Each position of the photo sensor 4 varies from the previous by the width of a pixel site or photo sensor site or natural multiple thereof, so that the same point of the image 12 is captured by all color channels and multiple exposure ranges.

After the multiple color and exposure values are obtained, software or hardware to take the various input values and combine them into a single high dynamic range image is used. The conversion to a high dynamic range image utilizes the multiple exposure and color channel values obtained by the photo sensor during the linear travel. No interpolation or "demosaicing" is required, nor do multiple exposure have to be aligned and combined to obtain high dynamic range values. The input values are all available from the input device and can be combined without introducing additional estimation errors.

Alternatively, the neutral density filters, or the gradient filters may be combined into the color photo pixel sites of varying densities, instead of being isolated from the colored photo pixel sites.

In a second embodiment of the present invention, a movable neutral density filter 8 with a range of neutral density values 8a, 8b, 8c is aligned with a photo sensor 4 to change the exposure values for individual pixel sites without changing the color values is moved across an image 2. In other words, the neutral density filter 8 make sites on the photo sensor 6 less sensitive to light without adding any color casts. The photo sensor 6 has an array in which each of the columns 6a linearly records red R, green G, and blue B information. The stripes 8c of the neutral density filter with the lowest density values will record the darkest color values or the shadows and the stripes 8a of the neutral density filter with the highest density values will record the brightest color values or highlights.

This neutral density filter, movable linearly across the image, for example by being mounted on a linear track, allows movement in the direction of the neutral density striping, as shown by the arrows in FIGS. 5-7. This linear movement allows the photo sensor 6 to be moved such that each column 6a of the array is exposed to the same light input during the time span of the exposure. Each position the neutral density filter 8 is moved to varies from the previous by the width of a pixel site or photo sensor site or multiple thereof. By varying the neutral density filter photo sensor position relative to the image 2 of a smiley face rapidly during exposure, a set of images across a defined range of exposure values can be captured and stored.

For example, in the photo sensor 6 shown in FIGS. 5-7, the neutral density filter 8 would be moved across the image. The image is captured when the sensor is in three distinct positions, in which the point 12 in the image 12 would be exposed to red and medium neutral density values as shown in FIG. 5, to red and lowest neutral density values as shown in FIG. 6, to red and highest neutral density values as shown in FIG. 7 and so on until each pixel site has been exposed to each of the varying neutral filter densities, by linearly moving the neutral density filter. Each position of the photo sensor or the pixel site varies from the previous by the width of a photo sensor site or natural multiple thereof so that the same point on the image 12 is captured by all color channels and multiple exposure ranges.

A wide range of dynamic values can be obtained with additional neutral density arrays and other color patterns could be selected. The number of rows or columns on the photo sensor could also vary based on the application. It is understood that the photo sensor array or arrangement of pixel sites shown in the figures is an unrealistically simple array and is used for explanation purposes only. It is understood that a Bayer filter map arrangement may be used as well as other current photo sensor arrangements.

After the multiple color and exposure values are obtained, software or hardware to take the various input values and combine them into a single high dynamic range image is used. The conversion to a high dynamic range image utilizes the multiple exposure and color channel values obtained by the photo sensor during the linear travel. No interpolation or "demosaicing" is required, nor do multiple exposure have to be aligned and combined to obtain high dynamic range values. The input values are all available from the input device and can be combined without introducing additional estimation errors.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

What is claimed is:

1. An imaging photo sensor comprising:
    a plurality of photo pixel sites arranged in an array comprising a photo sensor and a neutral density filter filtering the photo sensor, each neutral density filter having a density value, the density values of the neutral density filters being graduated over a range of densities;
    the neutral density filter being linearly movable adjacent to the photo sensor and moved relative thereto, wherein when the neutral density filter is moved across an image, each point in the image is exposed to at least one pixel site having each of the graduated density values and each of the photo pixel sites of the array is exposed to a same light input during a time span of exposure, such that the image is captured at a defined range of exposure values;
    wherein multiple exposure pixel data captured at multiple exposure values are combined into a single high dynamic range image.

2. The imaging photo sensor of claim 1, wherein the neutral density filter is mounted to a track.

3. The imaging photo sensor of claim 1, the array is a Bayer map.

4. The imaging photo sensor of claim 1, wherein the neutral density filter is linearly moved into positions that vary from a previous position by a width of at least one photo pixel site.

5. A method of capturing high dynamic images comprising:
    aligning an imaging photo sensor comprising a plurality of photo pixel sites arranged in an array comprising a photo sensor and a neutral density filter filtering the photo sensor, each neutral density filter having a density value, the density values of the neutral density filters being graduated over a range of densities;
    moving the neutral density filter adjacent to the photo sensor and linearly relative thereto across the image, such that each point in the image is exposed to at least one pixel site having each of the graduated density values and each of the photo pixel sites of the array is exposed to a same light input during a time span of exposure, capturing an image and combining the captured multiple exposure pixel data taken at multiple exposures into a single high dynamic range.

* * * * *